Patented Aug. 21, 1923.

1,465,743

UNITED STATES PATENT OFFICE.

GEORGE H. STEVENS, OF NEWARK, NEW JERSEY, AND CORL H. EATON, OF EAST PALESTINE, OHIO; SAID EATON ASSIGNOR OF EIGHT-TWENTIETHS TO ARTHUR R. KNIGHT, OF NEW YORK, N. Y., ONE-TWENTIETH TO SETH R. CLARK, OF SPRINGFIELD, MASSACHUSETTS, AND ONE-TWENTIETH TO D. P. SWISHER, OF OIL CITY, PENNSYLVANIA.

VULCANIZATION OF RUBBER.

No Drawing. Application filed July 30, 1920. Serial No. 399,979.

*To all whom it may concern:*

Be it known that we, GEORGE H. STEVENS, residing in Newark, State of New Jersey, and CORL H. EATON, residing in East Palestine, State of Ohio, and both citizens of the United States, have invented certain new and useful Improvements in the Vulcanization of Rubber, of which the following is a specification.

This invention relates to improvements in the use of organic substances that assist in, or accelerate the vulcanization of rubber, and has for its object the production of new and improved products, as well as their use, for this purpose.

The vulcanization of rubber consists in a suitable saturation of the rubber molecule with sulphur, and this saturation is most effectively accomplished by the use under heat of accelerating bodies or catalytic agents, which act as sulphur carriers.

These accelerating agents may be organic or inorganic. The most important however are of the former variety, and our invention relates to that kind or class.

We are aware that many different organic accelerators have been used for accelerating the vulcanization of rubber, and that numerous patents have been granted for them, but we believe the substance of our invention is totally new.

In this specification we do not presume to discuss any of the general theories of the chemical or catalytic action of organic accelerators, or attempt to explain the complexities of their action in the vulcanization of rubber, as their use is quite general, and their chemical behavior open to various theories of vulcanization, with which rubber workers are more or less conversant.

The theories as to the slight differences in the accelerating powers of numerous organic bodies now used for this purpose, are so varied, and in many instances so lacking in logical explanation, that our invention proposes to provide and make use of products that are not necessarily limited to such close distinction of differences, which at most are comparatively trifling, and especially so in those accelerating bodies that are low in nitrogen content.

Our purpose is instead, to utilize products that are so high in nitrogen as to be governable by much wider principles of practical application than these trivial distinctions of group constituent effectiveness, and in thus utilizing these higher nitrogen bodies, that apart from any theoretical variation of the accelerating activity of the different constituent chemical groups found in them, that such a margin of catalytic activity over the necessary requirements is obtained from them as to still permit of discussion as to their constituent group activity, and yet at the same time conform to our principles of application, and we then are able to provide organic accelerating bodies of much greater activity and utility than those now generally used.

We believe it is generally conceded that a large proportion of the organic accelerators now in use, while duly accelerating the cure of rubber in a varying degree, have so many objectionable properties, features and qualities, or fall so far short in fulfilling the purpose for which they are intended, as to often limit or curtail their general use, and in weighing their advantages against their disadvantages in certain work, they frequently are found to have but little margin left to recommend them.

Among these numerous objections may be mentioned, too low a melting point, decomposition occuring at too low a temperature, obnoxious vapors generated in handling and using, toxic effects in their use, undue hygroscopicity, loss in use from sublimation, impracticability for use on a large scale, liquid or semi-liquid bodies that are unsuitable for incorporating with rubber, non-accelerating decomposition products formed in vulcanizing, too low a nitrogen content, and too high a melting point to be effective in use.

Few of the accelerators now in use but what possess many of these objectionable points.

Accelerators possessing a nitrogen content of but 10 to 11% present but trifling differences in their accelerating powers and would seem then to be of insignificant consequence, and those accelerators with low melting points are prone to too rapid a decomposition at temperatures very near their fusing points.

From an examination of the long list of organic accelerating bodies that have been used as catalytic agents for accelerating the vulcanization of rubber, our observation is then: that their melting point plays a very important part in their utilization and that suitable accelerators should melt at a temperature not materially higher than 140° C. and preferably somewhat below this, that their greatest activity is after they have become melted, and that their stability at the temperature of vulcanization is responsible in a large degree for their more uniform efficiency.

As sulphur carriers they seem at their best when they have become melted, and their action appears more uniform and constant when they are not liable to decomposition. They are very active when possessing a nitrogen content of 17% or more, and we believe the use of an organic accelerating body conforming to these views, will result in greatly accelerating the vulcanization of rubber in which they are used, and produce thereby a higher tensile strength in the rubber than is usual.

The more general temperatures of vulcanization are from 120 to 140° C. (248 to 284° F.) and it is remarkable how few organic accelerators are in use that possess a melting point between these figures, and at which temperatures they would seem generally to be more stable under the usual vulcanizing heat.

Urea has a M. P. of 132° C. but decomposes at its M. P. and if moisture is present it decomposes at 100° C. into quite different decomposition products besides being very hygroscopic, and so its use is more or less limited.

There are however many nitrogenous bodies with melting points above 140° C. and the most of these are quite stable at that temperature, and even at their melting point, but they are inactive as accelerators if the vulcanization temperature is materially below the point at which they melt.

It seems to us then that the valuable accelerator is not necessarily the one that depends on its decomposition products for its acceleration, as is frequently claimed, but rather one that remains stable during vulcanization, that has its melting point within this temperature range and not too near its maximum point, that will not sublime in milling or during the period of vulcanization, and that while acting as a sulphur carrier exerts its action uniformly from the beginning to the end of vulcanization, or until the rubber molecule has become suitably saturated with the sulphur.

Its temperature of best activity then would seem to be at or a little above its melting point, and this melting point should be a little lower than the temperature of vulcanization.

Such an accelerator should then preferably be non-toxic in vapor and substance to the operators, not obnoxious in odor, and should preferably possess a nitrogen content of at least 17%.

On the other hand if the melting point, subliming point, or decomposition point occurs at too low a temperature, then the accelerator may be partially lost in the heat of milling, or its "kick" exhausted too soon in the vulcanizing, that is, before a suitable length of time has elapsed to effect a proper cure.

The list of organic accelerators that normally fall within this range, and that are free from the objectionable properties mentioned, as already shown is comparatively small, and so there is great need of additional bodies to use for this purpose that come within this range so that other properties can be made use of that may be possessed by them.

To provide a nitrogenous compound or organic accelerating body possessing these desired properties, that preferably melts between 120 and 140° C. and where the list already is comparatively lacking, and not be limited to the properties of any one body fulfilling even these requirements, but make available a large class of such accelerators, forms the scope and substance of our invention.

Where several such bodies are found, some of them then possess other properties that are superior to or more desirable for use, and that more nearly fulfill the requirements as accelerators than those now generally used, and each one of these bodies may be so governed that their melting point and nitrogen content can be modified or changed to meet the requirements of the desired vulcanization.

We have found that numerous high melting organic bodies, high in nitrogen content, desirable as to stability, not readily sublimed under the heat employed, non-toxic to the operators, without objectionable odor, non-hygroscopic, and many of quite high melting point, can be utilized as accelerators and that their melting point can be duly modified or lowered to a temperature between 120 and 140° C. and thus be used.

This is effected by using such high melting organic bodies as are miscible with other lower melting bodies, with which they may be incorporated to what is termed "solid solutions" or substantially alloys.

A "solid solution" is defined as a physically homogenous solid mixture of two or more substances, that is, solid mixtures that contain no larger aggregates than the molecules of the substances. In their equilibrium relations they closely resemble liquid solutions (Noyes and Sherrill, Gen. Prin. of Chem. pages 18, 113 and 114). The one in largest proportion being termed he solvent and the one in smallest proportion being termed the solute.

According to the laws governing alloys the melting point of any two or more miscible bodies is changed when they are incorporated together into a "solid solution" and the new melting point is usually lower than the melting point of either one of the constituent parts.

The common melting point of the combined product then, depends on the percents used of the two or more miscible solid constituents, that go to make up the "solid solution" or the new accelerating body.

It is thus possible to change the high melting point of any desired organic body to a lower one, and to also change the nitrogen content of the resultant body in the same way, according to the body or bodies that are combined in it, but which must be miscible with each other, and if suitable percents of each are employed in producing this last body, that any melting point required may be obtained within a comparatively wide range.

An illustration of a "solid solution" of two such organic bodies thus modified are as follows:

*Example 1. (Exceptionally good.)*

31 parts diphenylguanidine, M. P. 147, nitrogen content 19.9%

65 parts tetraphenylmelamine, M. P. 173, nitrogen content 19.5%

96 parts new accelerating body, M. P. 140, nitrogen content 19.6%

*Example 2. (Very good.)*

31 parts diphenylguanidine, M. P. 147, nitrogen content 19.9%

39 parts tetraphenylmelamine, M. P. 173, nitrogen content 19.5%

70 parts new accelerating body, M. P. 120, nitrogen content 19.6%

The two nitrogenous bodies have been combined in such proportions that the melting point is either 120 or 140° C. respectively and the nitrogen content practically the same in either case and substantially the same as either one of the component parts.

In a similar manner suitable percents of these two bodies may be combined to produce melting points between the temperatures of 120 and 140° C.

With the two products, each of substantially the same nitrogen content, they then act much as one product, and apparently the tetraphenylmelamine (tetraphenyltricarbodiamide $C_{27}H_{22}N_8$ M. P. 173—217) attains its full efficiency through a proper lowering of its melting point, and the "solid solution" containing the higher percent of it proves the better accelerator of the two. This observation then would lead one generally to use the larger percent of the higher melting bodies of high nitrogen content, because of their greater stability under the heat and pressure of vulcanization, and to select for use with them, lower melting bodies that are not detrimental to them, such bodies being selected not for their nitrogen content alone, but rather for their ability of suitably modifying the melting point of the higher melting nitrogenous body used.

In the first "solid solution" the accelerating effect appears to be utilizable for a longer time, whereas in the second "solid solution" the acceleration seems more energetic at first, but the "kick" much sooner expended.

It is possible to even extend these melting points both ways, by still further varying the proportions in the resultant product, but the illustrations given cover a sufficiently wide range to meet the requirements of most any desired acceleration.

It is unnecessary to give other similar examples because their number is limitless, as each varying percent of the constituents will change the melting point, as well as the nitrogen content of the result, and so a pre-determined temperature may be fixed as a standard, and a minimum nitrogen content can be decided upon, and two or more organic bodies of promising characteristics, and which are properly miscible with each other can be selected, with one or both of them of high melting point, and then suitable proportions of each can be used, then by dissolving them in a common solvent, and either precipitating, evaporating, or properly combining them together, the desired melting point of the resultant product is obtained.

It is an easy matter then to correct this melting point by a suitable change in the succeeding proportions of the constituent parts.

One method of properly incorporating tetraphenylmelamine and diphenylguanidine together, is to form a hydrochloride of them both in suitable proportions, neutralize this and then precipitate, filter the precipitate, wash with water, dry and then use.

We do not however limit ourselves to this method of incorporating two or more organic accelerating bodies into a "solid solution", as they may be precipitated from their sulphates, or from solutions of other soluble salts, or from other chemical combinations, or evaporated from inert solvents, or fused together by heat, though the latter method seldom combines the constituents without some marked change and then might not be a "solid solution" of them.

Any of these methods may, or any other method may be used so long as the resultant product is a suitable modification in melting point of the constituent products, and is a "solid solution" of them. Any such method of combination is understood to be included within the scope of our invention.

It is however readily seen that by forming soluble salts of the constituent parts in combining them, leaves less opportunity for decomposition occurring in producing the final product than there would be by fusing or by the use of high heat in evaporating them from neutral solutions to dryness.

Different constituent products must be incorporated together in different manner, depending on their chemical behaviour toward each other, their decomposition temperatures, the nature of their solvent, and the decomposition products that they produce. In fact more than one way may frequently be found to properly combine the same constituents to the desired end.

Tetraphenylmelamine and triphenylguanidine when combined to a "solid solution" in proportions similar to the first example give a product of a little lower melting point and some less nitrogen content.

Usually the higher the melting point of the constituent products, the higher will be the minimum melting point of the final product, but it is comparatively easy to obtain a range of at least 20 degrees, by varying the proportions, and be able somewhere within this range to fix the melting point of the desired product, even if the constituents do both melt fairly high.

Our invention then consists in utilizing one or more such bodies as may have a suitably high nitrogen content, that preferably, would be non-toxic to the lungs and skin, non-hygroscopic, that would be free from objectionable odor, that might have too high a melting point to ordinarily be suitable as an accelerator, but which when combined with a body of a suitably lower melting point and miscible with it, would give a product with a common melting point of such temperature as might be most desired.

This permits then of going into those products high in nitrogen content, but with melting points so high as to have prevented their recognition thus far as valuable accelerators in the curing of rubber.

Having now described our process, and having shown in what manner the same may be utilized, what we claim as new, and desire to secure by Letters Patent is:

1. The process of vulcanizing rubber which consists in, modifying the melting point or nitrogen content of nitrogenous bodies that melt above the ordinary temperatures of vulcanization, by incorporating with them, into a "solid solution", one or more of such other miscible or suitable bodies as will so modify them as to make them available as accelerators, then incorporating the accelerator thus formed into rubber, and then heating the resultant mixture with a vulcanizing agent to effect vulcanization.

2. The process of vulcanizing rubber which consists in, incorporating with rubber a "solid solution", containing one or more nitrogenous bodies that melt above the ordinary temperatures of vulcanization, as an accelerator, said "solid solution" accelerator having a predetermined melting point and nitrogen content resultant from a calculated selection of its constituents, and then heating the resultant mixture with a vulcanizing agent to effect vulcanization.

3. In the vulcanization of rubber, the combination of: a "solid solution" composed of two or more miscible organic bodies, one of which possesses a melting point above the ordinary temperatures of vulcanization, and said "solid solution" having been given a predetermined melting point or nitrogen content different from that of either of its component parts,—as an accelerator; sulphur or a suitable compound of sulphur,—as a vulcanizing agent; raw or compounded rubber,—within a vulcanizer for curing; and heat and pressure,—applied to these materials when compounded to vulcanize them.

4. The process of vulcanizing rubber which consists in, modifying the melting point of tetraphenylmelamine by combining it with another suitable body so that it may be used as an accelerator, then incorporating the accelerator thus formed into rubber, and then heating the resultant mixture with a vulcanizing agent to effect vulcanization.

5. The process of vulcanizing rubber which consists in, combining tetraphenylmelamine with one or more other miscible or suitable bodies into a "solid solution" as an accelerator, then incorporating the accelerator thus formed into rubber, and then heating the resultant mixture with a vulcanizing agent to effect vulcanization.

6. The process of vulcanizing rubber which consists in, combining diphenylguanidine with tetraphenylmelamine as an accelerator, then incorporating the accelerator thus formed into rubber, and then heating the resultant mixture with a vulcanizing agent to effect vulcanization.

7. The process of vulcanizing rubber which consists in, incorporating a vulcanizing agent with rubber, then under heat, accelerating vulcanization through the presence of diphenylguanidine and tetraphenylmelamine in the rubber mixture.

GEORGE H. STEVENS.
CORL H. EATON.

Witnesses:
Thos H. Jenkins,
Albert J. Buyer.